United States Patent
Kaplunov et al.

(10) Patent No.: US 10,735,273 B2
(45) Date of Patent: Aug. 4, 2020

(54) USING MACHINE LEARNING TO MAKE NETWORK MANAGEMENT DECISIONS

(71) Applicant: Accenture Global Solutions Limited, Dublin (IE)

(72) Inventors: Stanley Kaplunov, Hertford (GB); Athanasios Malevitis, London (GB); Irina Niculicea, London (GB); Stephen Byron Holt, London (GB); Pingzhou Liu, London (GB)

(73) Assignee: Accenture Global Solutions Limited, Dublin (IE)

( * ) Notice: Subject to any disclaimer, the term of this patent is extended or adjusted under 35 U.S.C. 154(b) by 217 days.

(21) Appl. No.: 15/664,627

(22) Filed: Jul. 31, 2017

(65) Prior Publication Data

US 2019/0036789 A1 Jan. 31, 2019

(51) Int. Cl.
*H04L 12/24* (2006.01)
*G06Q 10/06* (2012.01)
*H04L 12/751* (2013.01)
*H04L 12/707* (2013.01)
*H04L 12/26* (2006.01)

(52) U.S. Cl.
CPC ......... *H04L 41/16* (2013.01); *G06Q 10/0639* (2013.01); *G06Q 10/06393* (2013.01); *H04L 41/142* (2013.01); *H04L 41/147* (2013.01); *H04L 43/08* (2013.01); *H04L 45/08* (2013.01); *H04L 45/22* (2013.01)

(58) Field of Classification Search
CPC ..... H04L 41/16; H04L 41/142; H04L 41/147; H04L 43/08; H04L 45/08; H04L 45/22; G06Q 10/0639

USPC ........................................................ 709/224
See application file for complete search history.

(56) References Cited

U.S. PATENT DOCUMENTS 8,200,527 B1 * 6/2012 Thompson ......... G06Q 10/0639
705/7.39
9,439,081 B1 6/2016 Knebl et al.
(Continued)

OTHER PUBLICATIONS

Extended European Search report corresponding to EP 18185757.4 dated Oct. 18, 2018, 7 pages.
(Continued)

*Primary Examiner* — Umar Cheema
*Assistant Examiner* — Tony Williams
(74) *Attorney, Agent, or Firm* — Harrity & Harrity, LLP

(57) ABSTRACT

A device may receive one or more data models that have been trained on a set of historical network performance indicators. The set of historical network performance indicators may include metrics associated with measuring network performance for one or more data centers. The device may receive network data for a group of user devices that are actively using the one or more data centers for network services. The device may determine a set of network performance indicators for the one or more data centers. The device may generate, by providing the set of network performance indicators as input to the one or more data models, one or more recommendations associated with improving network performance. The device may perform, after generating the one or more recommendations, one or more actions associated with improving network performance.

19 Claims, 9 Drawing Sheets

(56) References Cited

U.S. PATENT DOCUMENTS

| | | | | |
|---|---|---|---|---|
| 2007/0005302 A1* | 1/2007 | Graupner | ............ | G06F 11/3447 |
| | | | | 702/188 |
| 2013/0031242 A1* | 1/2013 | Raghavendran | .... | H04L 12/6418 |
| | | | | 709/224 |
| 2013/0304905 A1* | 11/2013 | Appachiappan | .... | H04L 41/5032 |
| | | | | 709/224 |
| 2014/0039965 A1* | 2/2014 | Steven | ............. | G06Q 10/06315 |
| | | | | 705/7.25 |
| 2016/0028599 A1* | 1/2016 | Vasseur | ................... | H04L 41/16 |
| | | | | 370/252 |
| 2016/0197834 A1* | 7/2016 | Luft | .................... | H04L 12/4641 |
| | | | | 709/223 |
| 2017/0006135 A1* | 1/2017 | Siebel | ..................... | H04L 67/02 |
| 2017/0063906 A1* | 3/2017 | Muddu | ................ | G06K 9/2063 |

OTHER PUBLICATIONS

Yao N., et al., "Reducing Congestion Over Hotspot Clusters in WCDMA Networks", IEEE Wireless Communications and Networking Conference, Mar. 1, 2007, pp. 3731-3735, XP031097821.

* cited by examiner

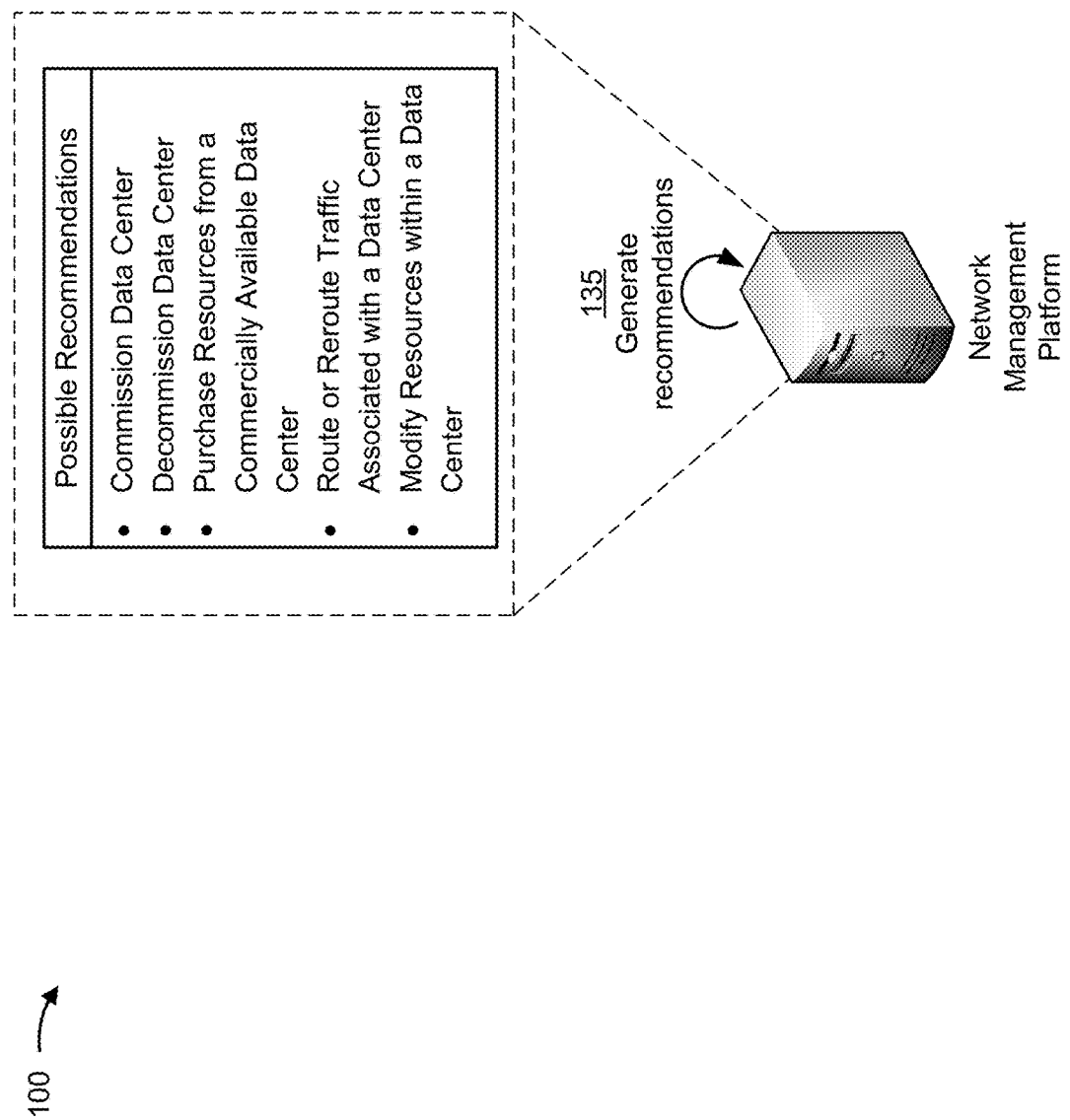

USING MACHINE LEARNING TO MAKE NETWORK MANAGEMENT DECISIONS

BACKGROUND

Machine learning allows computers to process data to make predictions. For example, a machine learning tool may use a data model to process data to make classifications, predictions, forecasting decisions, or the like.

SUMMARY

According to some possible implementations, a device may include one or more processors to obtain historical network data that includes information associated with a group of user devices that accessed network services within a geographic region. The one or more processors may determine a set of historical network performance indicators for one or more data centers within the geographic region by analyzing the historical network data. The one or more processors may train one or more data models using the set of historical network performance indicators. The one or more processors may receive, after training the one or more data models, network data for a group of user devices actively using network services in the geographic region. The one or more processors may determine a set of network performance indicators for the one or more data centers by analyzing the network data. The one or more processors may generate, by providing the set of network performance indicators as input to the one or more data models, one or more recommendations associated with improving network performance. The one or more processors may perform, based on the one or more recommendations, one or more actions associated with improving network performance.

According to some possible implementations, a method may include receiving, by a device, one or more data models that have been trained on a set of historical network performance indicators. The set of historical network performance indicators may include metrics associated with measuring network performance for one or more data centers. The method may include receiving, by the device, network data for a group of user devices that are actively using the one or more data centers for network services. The method may include determining, by the device, a set of network performance indicators for the one or more data centers. The method may include generating, by the device and by providing the set of network performance indicators as input to the one or more data models, one or more recommendations associated with improving network performance. The method may include performing, by the device and after generating the one or more recommendations, one or more actions associated with improving network performance.

According to some possible implementations, a non-transitory computer-readable medium may store one or more instructions that, when executed by the one or more processors, cause the one or more processors to receive one or more data models that have been trained on a set of historical network performance indicators. The set of historical network performance indicators may include metrics associated with measuring network performance for one or more data centers. The one or more instructions may cause the one or more processors to receive network data for a group of user devices that are actively using the one or more data centers for network services. The one or more instructions may cause the one or more processors to determine, by analyzing the network data, a set of network performance indicators for the one or more data centers. The one or more instructions may cause the one or more processors to generate, by providing the set of network performance indicators as input to the one or more data models, one or more recommendations associated with improving network performance. The one or more recommendations may include at least one of: a recommendation to commission a new data center, a recommendation to decommission a data center of the one or more data centers, a recommendation to route or reroute traffic at one or more of the one or more data centers, or a recommendation to modify resources associated with one or more of the one or more data centers. The one or more instructions may cause the one or more processors to perform, after generating the one or more recommendations, one or more actions associated with improving network performance.

BRIEF DESCRIPTION OF THE DRAWINGS

FIGS. 1A-1F are diagrams of an overview of an example implementation described herein;

DETAILED DESCRIPTION

Figure 1A:
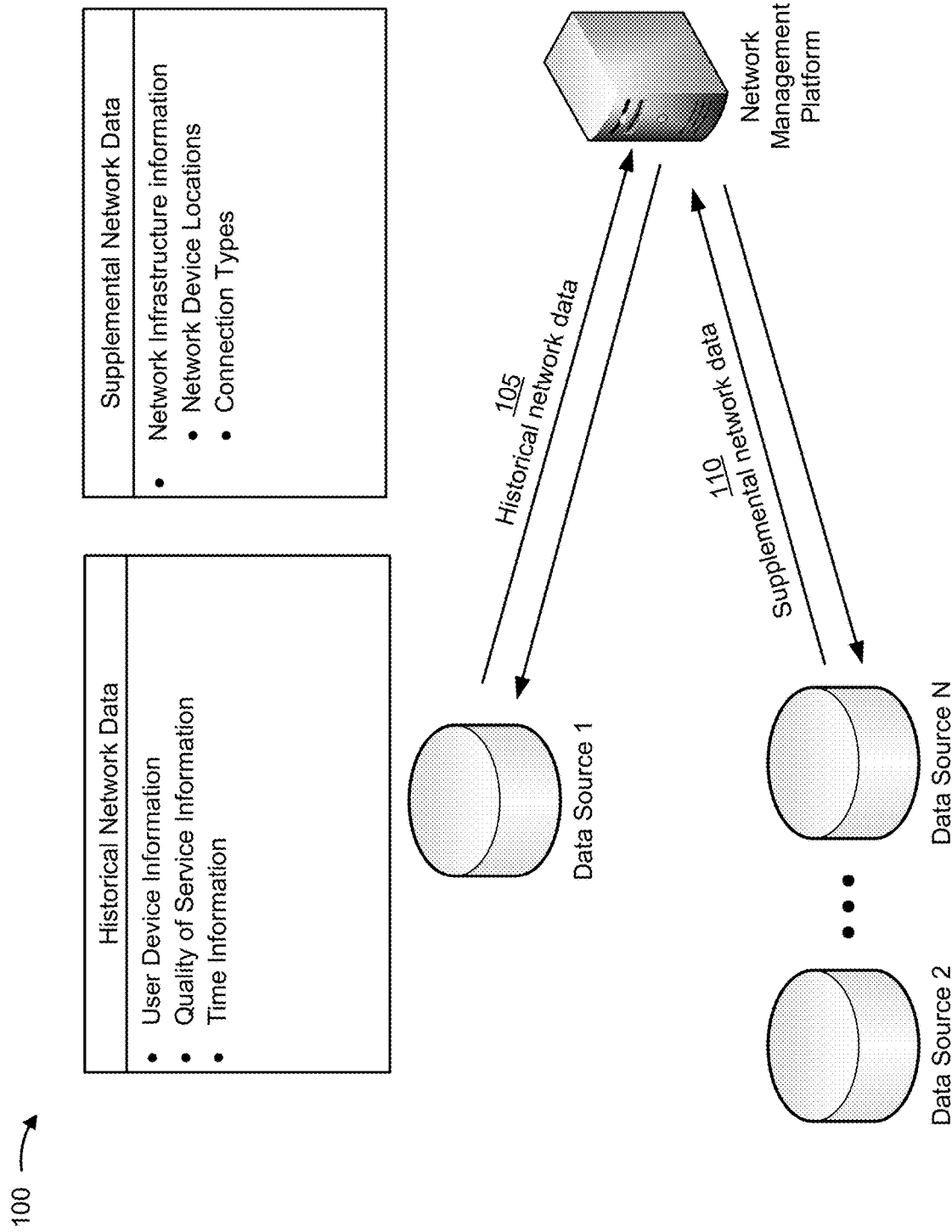

The following detailed description of example implementations refers to the accompanying drawings. The same reference numbers in different drawings may identify the same or similar elements.

As demand for mobile devices and internet of things (IoT) devices continues to increase, network service providers may need to improve or modify network infrastructure to maintain or improve upon network performance. Without improvements to network infrastructure, increases to the number of devices accessing the network and increases in data usage per device may lead to decreases in quality of service (e.g., which may cause customer churn), increases in network latency, and/or the like.

Some implementations described herein provide a network management platform to use machine learning to generate recommendations that may be implemented to improve network performance. For example, the network management platform may analyze historical network data and supplemental network data to determine a set of historical network performance indicators. In this case, the network management platform may use the set of historical network performance indicators to train one or more data models.

Additionally, the network management platform may receive network data for a group of users actively using network services, and may analyze the network data and the supplemental network data to determine a set of network performance indicators. In this case, the network management platform may provide the set of network performance indicators as input for the one or more data models, which may cause the one or more data models to output one or more recommendations that may be implemented to improve network performance.

While implementations described herein use machine learning to improve network performance, other implementations may use machine learning to improve performance in a number of different industries or technology areas, such as road traffic management (e.g., by forecasting traffic anomalies and dynamically adjusting speed limits or suggesting alternate paths for drivers), electrical grid management (e.g., by forecasting power surges and using a load balancing technique to prevent network failure during the power surge), and/or the like.

By using machine learning to generate recommendations that may be implemented to improve network performance, the network management platform conserves network resources by determining efficient routing and rerouting paths, reduces cost (e.g., by saving energy resources), improves customer service (e.g., by reducing customer churn), and/or the like. Additionally, by efficiently processing real-time network data (e.g., real-time relative to receiving network data from one or more data centers), the network management platform is able to provide recommendations that may be implemented to improve current network performance.

FIGS. 1A-1F are diagrams of an overview of an example implementation 100 described herein. As shown in FIGS. 1A-1F, example implementation 100 may include a network management platform that uses machine learning to train one or more data models that may be used to provide, to a client device, one or more recommendations associated with improving network performance.

As shown in FIG. 1A, and by reference number 105, the network management platform may obtain historical network data from a data source (shown as data source 1). For example, the network management platform may obtain historical network data for a geographic region that identifies a service area for a network service provider. In this case, the data source may store historical network data for customers of the network service provider, and the network service provider may provide access to the historical network data to allow the network management platform to obtain data to be processed to train a data model.

The historical network data may include user device information, time information, and/or quality of service information for a group of user devices that have accessed a network service (e.g., a call service, a data service, etc.) within the geographic region. For example, the user device information may include an international mobile subscriber identifier (IMSI). The time information may include time stamps indicating a time and/or a duration of a network service. The quality of service information may include a call establishment success rate, a handover success rate, and/or the like. Additionally, the historical network data may include network device identifiers, such as data center identifiers associated with one or more data centers that are used to provide particular network services, cell identifiers indicating an area of service provided by one or more base stations that are used to provide particular network services, and/or the like.

As shown by reference number 110, the network management platform may obtain supplemental network data. In some cases, the data source of the network service provider may not provide complete network infrastructure information. In this case, the network management platform may obtain supplemental network data from one or more additional data sources (shown as data source 2 through data source N). As shown, the supplemental network data may include location information for one or more network devices (e.g., data centers, base stations, etc.) in the geographic region, information indicating a type of connection (e.g., a fiber connection, a wireless connection (e.g., using microwaves), etc.) between network devices (e.g., a connection between data centers, a connection between base stations, a connection between a data center and a base station, etc.), and/or the like.

Additionally, or alternatively, the network management platform may receive supplemental network data via input received from a domain expert. For example, the network management platform may receive supplemental network data via input from a telecommunications expert that has knowledge relating to network infrastructure.

In this way, the network management platform is able to obtain historical network data and/or supplemental network data that may be processed to determine historical network performance indicators for the one or more data centers in the geographic region.

Figure 1B:
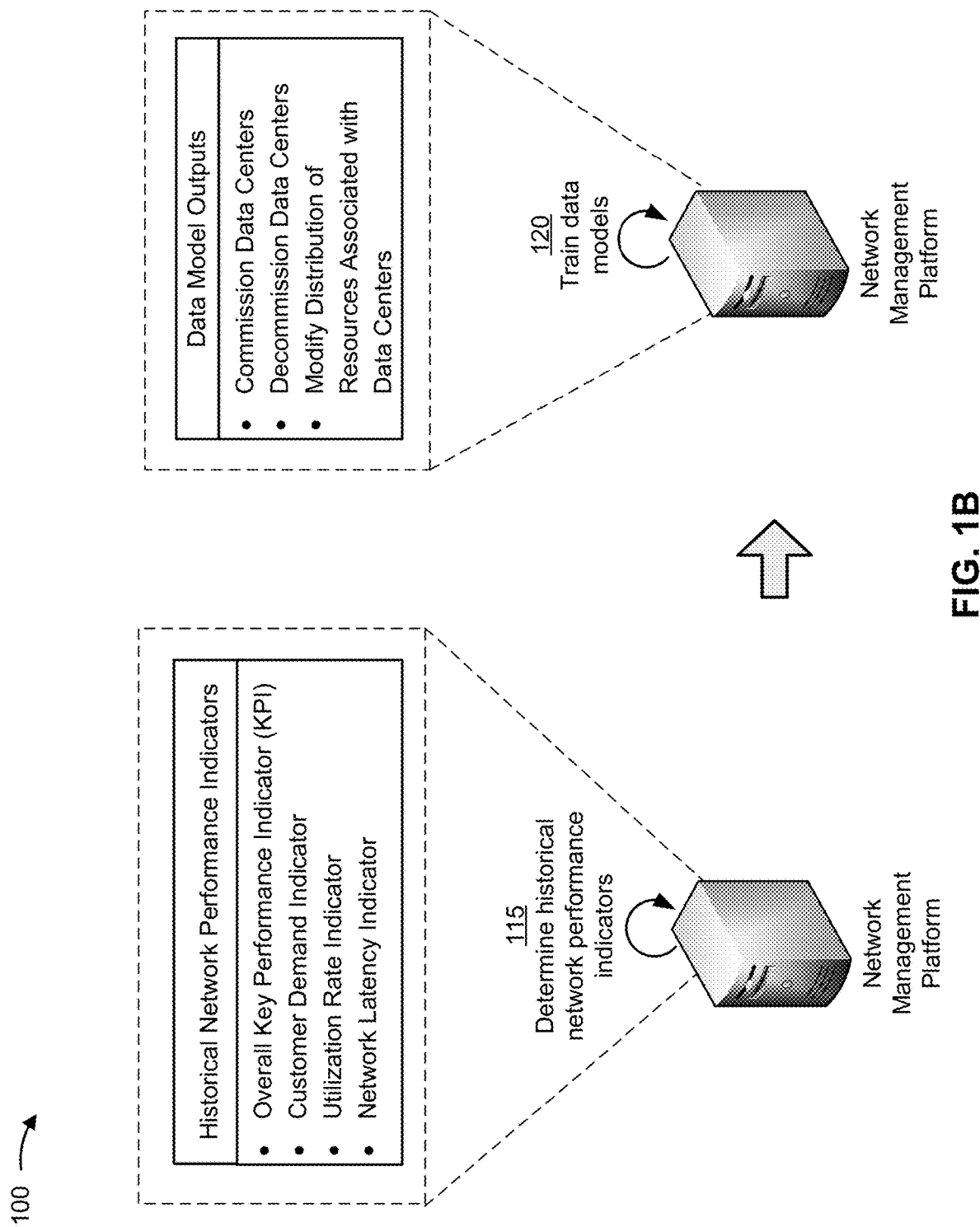

As shown in FIG. 1B, and by reference number 115, the network management platform may determine a set of historical network performance indicators. For example, the network management platform may analyze the historical network data and/or the supplemental network data to determine a set of historical network performance indicators. The set of historical network performance indicators may include a set of overall key performance indicators (KPIs), a set of customer demand indicators, a set of utilization rate indicators, a set of network latency indicators, and/or the like.

In some implementations, the network management platform may determine a set of historical network performance indicators for a data center. For example, the network management platform may determine a set of historical network performance indicators for each data center of the one or more data centers included in the geographic region. Additionally, the network management platform may determine a historical network performance indicator for a set of time intervals within a particular time period (e.g., every hour of a day, every minute of a day, etc.).

As an example, the network management platform may analyze historical network data to determine an overall KPI for a data center for a set of time intervals. For example, assume the historical network data includes information indicating a number of attempts to establish a data session, a number of successful attempts to establish a data session, a number of handover attempts, and a number of successful handover attempts. In this case, the network management platform may analyze the historical network data to determine a call success rate and a handover success rate for each time interval of the set of time intervals, and may assign weights to the call success rate and handover success rate values to determine an overall KPI for each time interval. Additionally, as described further herein, the network management platform may perform a similar analysis to determine a customer demand indicator, a utilization rate indicator, and a network latency indicator for one or more data centers in the geographic region.

In this way, the network management platform may determine a set of historical network performance indicators, and may use the historical network performance indicators to train one or more data models.

As shown by reference number 120, the network management platform may train one or more data models. For example, the network management platform may use the set of historical network performance indicators and one or more machine learning techniques to train one or more data models. In this case, the network management platform may train a data model to generate a recommendation indicating whether to commission a new data center, a recommendation indicating a location for the new data center, a recommendation indicating whether to decommission a data center, a recommendation to route or reroute traffic associated with the one or more data centers, and/or the like.

In some implementations, as described further herein, the network management platform may train a decision tree using the set of historical network performance indicators and one or more additional techniques. For example, the network management platform may train a decision tree by applying a location identification technique (e.g., a K-means clustering algorithm) to the set of historical network performance indicators to recommend a particular location for a new data center. Additionally, or alternatively, the network management platform may train a decision tree by applying a forecasting technique (e.g., a linear regression algorithm) or an anomaly detection technique to the set of historical network performance indicators to predict network traffic at particular time intervals. Additionally, or alternatively, the network management platform may train a decision tree by applying a path-finding technique (e.g., Dijkstra's algorithm) to the set of historical network performance indicators to make one or more traffic routing decisions to improve traffic flow within the geographic region.

In some implementations, the network management platform may test the data model. For example, the network management platform may train the data model with a first set of historical network data, and may test the data model with a second set of historical network data. In this case, the network management platform may determine a set of historical network performance indicators for the second set of historical network data, and may provide the second set of historical network performance indicators as input for the data model. Here, the network management platform may determine whether outputs of the data model satisfy a threshold level of accuracy, and may retrain the data model until the outputs satisfy the threshold.

In this way, the network management platform trains and tests a data model that may be used to generate recommendations in real-time (e.g., relative to receiving network data for user devices actively using network services), and that may be implemented to improve network performance.

Figure 1C:
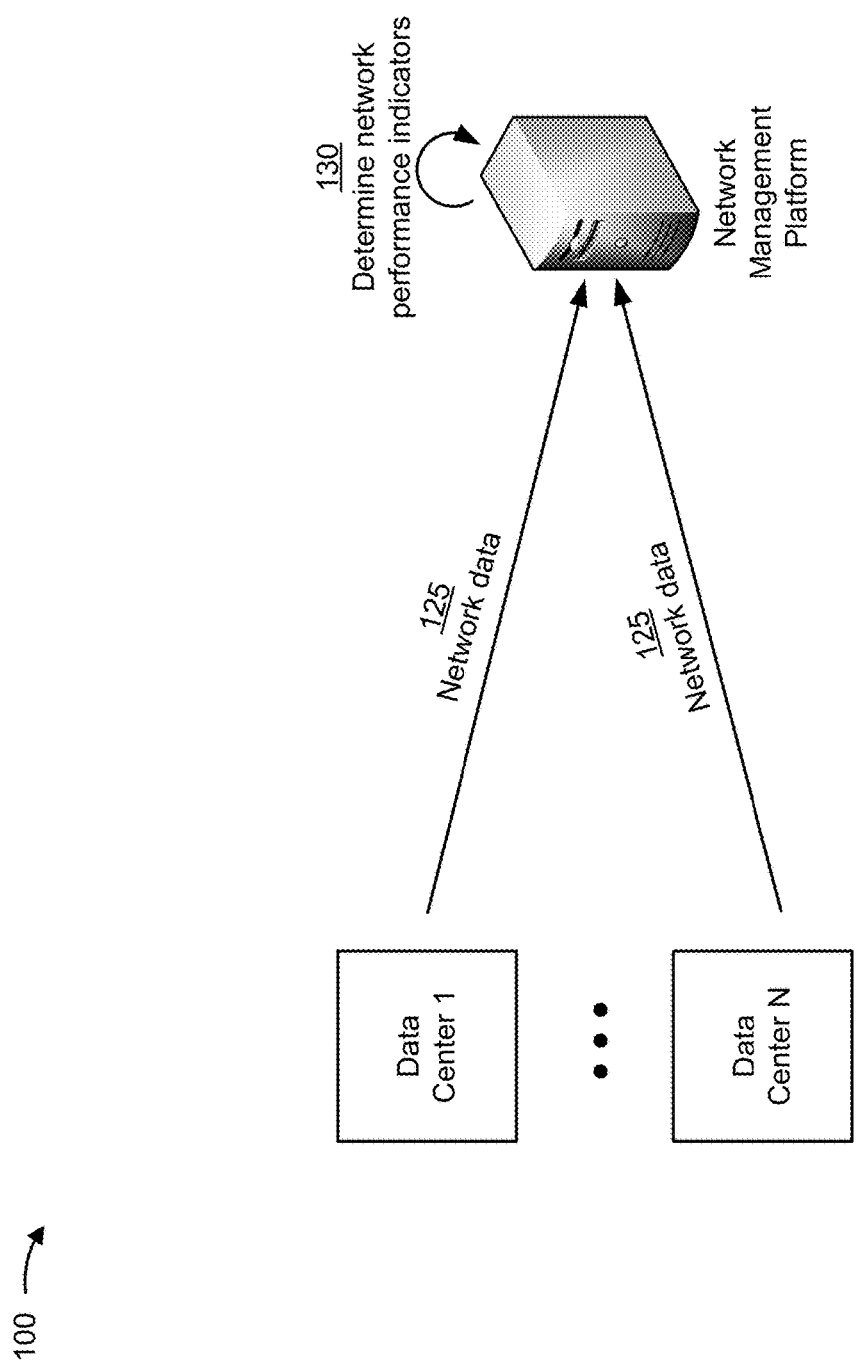

As shown in FIG. 1C, and by reference number 125, the network management platform may obtain network data from the one or more data centers. For example, the network management platform may receive network data associated with a group of user devices that are actively using network services.

As shown by reference number 130, the network management platform may determine a set of network performance indicators for the one or more data centers. For example, the network management platform may analyze the network data and the supplemental network data to determine an overall KPI, a customer demand indicator, a utilization rate indicator, a network latency indicator, and/or the like, for a set of time intervals.

In this way, the network management platform may determine a set of network performance indicators for one or more data centers that are actively supporting traffic.

As shown in FIG. 1D, and by reference number 135, the network management platform may generate one or more recommendations that may be implemented to improve network performance. For example, the network management platform may provide the set of network performance indicators as input to the one or more data models, which may cause the one or more data models to output a recommendation to commission a new data center, a recommendation to decommission a data center, a recommendation to purchase and utilize resources (e.g., physical resources, virtual resources, etc.) of a commercially available data center, a recommendation to route or reroute traffic to or from the one or more data centers, a recommendation to modify (e.g., add, remove, etc.) resources within a data center, and/or the like.

As an example, assume the set of network performance indicators include a low overall KPI (e.g., a low overall KPI may be associated with low network performance) and a high network latency indicator for a set of time intervals for a data center within the geographic region. In this case, a data model that has been trained using a location identification technique and/or a path-finding technique may output a recommendation indicating to commission a new data center at a particular geographic location.

In this way, the network management platform is able to use the data model to generate recommendations that, if implemented, may improve network performance (e.g., by improving overall KPI, reducing network latency, etc.).

Figure 1E:
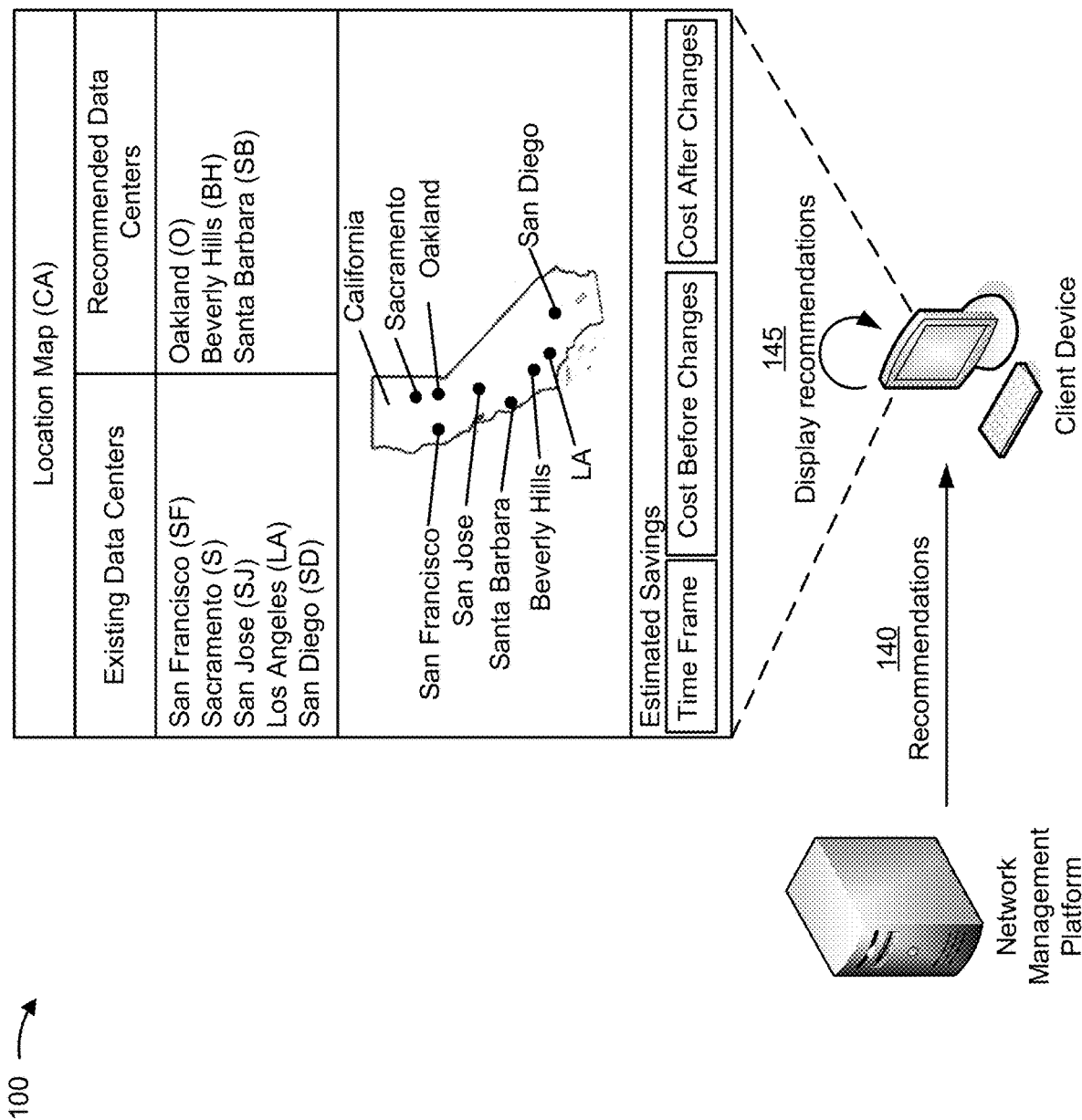

As shown in FIG. 1E, and by reference number 140, the network management platform may provide the one or more recommendations to a client device. As shown by reference number 145, the client device may display the one or more recommendations on a user interface. For example, a manager of a data center or an executive of the network service provider may access the client device to view the one or more recommendations via a user interface.

As an example, assume the network management platform generates and provides, to the client device, a recommendation to commission three new data centers. In this case, the user interface of the client device may display a location map to show locations of active data centers and locations of data centers that are included in the recommendation. As shown, the location map may identify geographic locations of the one or more data centers that actively support network traffic (e.g., San Francisco (SF), Sacramento (S), San Jose (SJ), Los Angeles (LA), and San Diego (SD). Additionally, the location map may identify geographic locations of the recommended new data centers (e.g., Oakland (O), Beverly Hills (BH), and Santa Barbara (SB)). Furthermore, the user interface may display additional information associated with commissioning the new data centers, such as an estimated time frame to commission the new data centers, a cost (e.g., based on energy usage) before commissioning the new data centers, a cost after commissioning the new data centers, and/or the like.

In this way, the client device is able to receive and display recommendations associated with improving network performance.

Figure 1F:
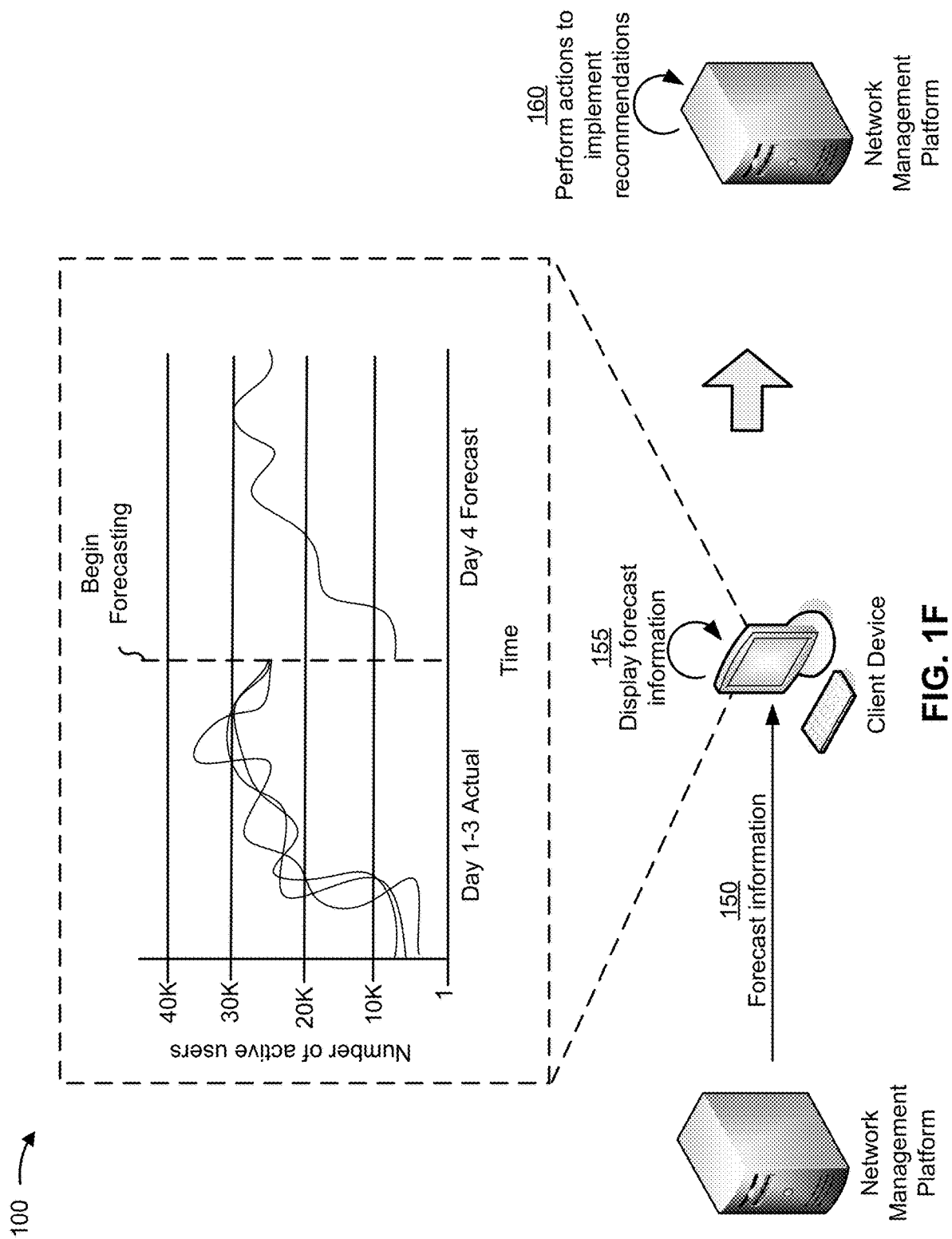

As shown in FIG. 1F, and by reference number 150, the network management platform may provide forecast information to the client device. For example, the network management platform may use a data model that has been trained using a forecasting technique (e.g., a linear regression algorithm) to analyze time stamps and an active user count (i.e., a total number of active users in a given time period) to forecast time intervals that may be associated with high traffic.

As shown by reference number 155, the client device may display the forecast information on a user interface. For example, the user interface may display historical network data (e.g., shown as "Day 1-3 Actual") and the forecast information (e.g., shown as "Day 4 Forecast"). In this case, the forecast information may indicate one or more time periods that are likely to be associated with high traffic, may be used to predict an amount of network traffic volume for a time period, and/or the like. By providing forecast information to the client device, a data center manager or an executive of a network service provider may take one or more actions to improve network performance.

Additionally, the network management platform may use forecast information to generate a recommendation. For example, the network management platform may generate a recommendation to route or reroute traffic associated with the one or more data centers prior to a forecasted spike in traffic at a particular data center.

As shown by reference number 160, the network management platform may perform one or more actions to implement the one or more recommendations. For example, the network management platform may generate an instruction to begin commissioning a new data center, generate an instruction to decommission a data center, generate an instruction to route and/or reroute traffic to or from the one or more data centers, and/or the like.

By generating and implementing recommendations to improve network performance, the network management platform efficiently and effectively utilizes network resources relative to a network infrastructure that is unable to use machine learning to make network management decisions.

As indicated above, FIGS. 1A-1F are provided merely as an example. Other examples are possible and may differ from what was described with regard to FIGS. 1A-1F. For example, while the one or more recommendations are associated with data centers, in other implementations, modifications to network infrastructure or a distribution of network resources may be made by modifying other network devices, such as base stations, routers, switches, and/or the like. Furthermore, as described above, other implementations may use machine learning to improve efficiency in a number of different fields, such as traffic management, electrical grid management, and/or the like.

Figure 2:
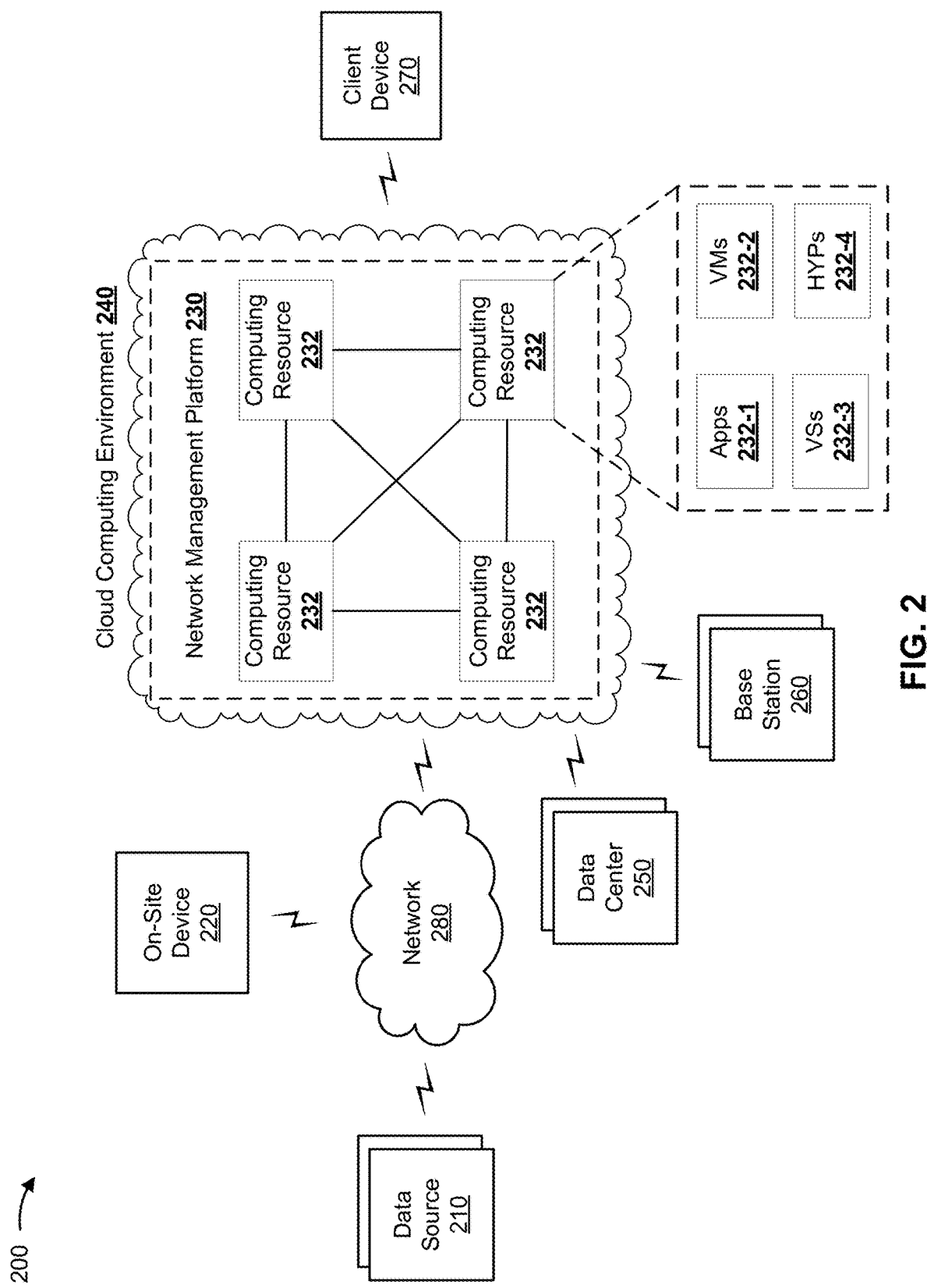
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a data source 210, an on-site device 220, a network management platform 230 hosted within a cloud computing environment 240, a data center 250, a base station 260, a client device 270, and a network 280. Devices of environment 200 may interconnect via wired connections, wireless connections, or a combination of wired and wireless connections.

Data source 210 includes one or more devices capable of receiving, storing and providing information associated with a network service provider. For example, data source 210 may include a server device or a group of server devices. In some implementations, data source 210 may store historical network data. In some implementations, data source 210 may receive network data associated with a network that is actively supporting traffic (e.g., to be stored as historical network data). In some implementations, data source 210 may provide historical network data to on-site device 220 or network management platform 230.

On-site device 220 includes one or more devices capable of receiving, storing, generating, processing, and/or providing information associated with a network and/or users accessing the network. For example, on-site device 220 may include a service device or a group of server devices. In some implementations, on-site device 220 may be located on the premises of a network service provider, and may carry out one or more actions of network management platform 230.

Network management platform 230 includes one or more devices capable of receiving, storing, generating, processing, and/or providing information associated a network and/or users accessing the network. For example, network management platform 230 may include a cloud server device or a group of cloud server devices. In some implementations, network management platform 230 may receive, from a set of data centers 250, network data associated with a network that is actively supporting traffic. In some implementations, network management platform 230 may provide, to client device 270, one or more recommendations for display on a user interface.

In some implementations, as shown, network management platform 230 may be hosted in cloud computing environment 240. Notably, while implementations described herein describe network management platform 230 as being hosted in cloud computing environment 240, in some implementations, network management platform 230 may not be cloud-based (i.e., may be implemented outside of a cloud computing environment) or may be partially cloud-based.

Cloud computing environment 240 includes an environment that hosts network management platform 230. Cloud computing environment 240 may provide computation, software, data access, storage, and/or other services that do not require end-user knowledge of a physical location and configuration of system(s) and/or device(s) that host network management platform 230. As shown, cloud computing environment 240 may include a group of computing resources 232 (referred to collectively as "computing resources 232" and individually as "computing resource 232").

Computing resource 232 includes one or more personal computers, workstation computers, server devices, or another type of computation and/or communication device. In some implementations, computing resource 232 may host network management platform 230. The cloud resources may include compute instances executing in computing resource 232, storage devices provided in computing resource 232, data transfer devices provided by computing resource 232, etc. In some implementations, computing resource 232 may communicate with other computing resources 232 via wired connections, wireless connections, or a combination of wired and wireless connections.

As further shown in FIG. 2, computing resource 232 may include a group of cloud resources, such as one or more applications ("APPs") 232-1, one or more virtual machines ("VMs") 232-2, virtualized storage ("VSs") 232-3, one or more hypervisors ("HYPs") 232-4, or the like.

Application 232-1 includes one or more software applications that may be provided to or accessed by client device 270. Application 232-1 may eliminate a need to install and execute the software applications on client device 270. For example, application 232-1 may include software associated with network management platform 230 and/or any other software capable of being provided via cloud computing environment 240. In some implementations, one application 232-1 may send/receive information to/from one or more other applications 232-1, via virtual machine 232-2.

Virtual machine 232-2 includes a software implementation of a machine (e.g., a computer) that executes programs like a physical machine. Virtual machine 232-2 may be either a system virtual machine or a process virtual machine, depending upon use and degree of correspondence to any real machine by virtual machine 232-2. A system virtual machine may provide a complete system platform that supports execution of a complete operating system ("OS"). A process virtual machine may execute a single program, and may support a single process. In some implementations, virtual machine 232-2 may execute on behalf of a user (e.g., client device 270), and may manage infrastructure of cloud computing environment 240, such as data management, synchronization, or long-duration data transfers.

Virtualized storage 232-3 includes one or more storage systems and/or one or more devices that use virtualization techniques within the storage systems or devices of computing resource 232. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 232-4 provides hardware virtualization techniques that allow multiple operating systems (e.g., "guest operating systems") to execute concurrently on a host computer, such as computing resource 232. Hypervisor 232-4 may present a virtual operating platform to the guest operating systems, and may manage the execution of the guest operating systems. Multiple instances of a variety of operating systems may share virtualized hardware resources.

Data center 250 includes a group of devices capable of receiving, storing, processing, and/or providing information associated with a network and/or users accessing the network. For example, data center 250 may include a group of server devices. In some implementations, data center 250 may support traffic flow for a group of user devices within a geographic region. In some implementations, data center 250 may provide network data to on-site device 220 or network management platform 230. In some implementations, data center 250 may receive, from on-site device 220 or network management platform 230, instructions associated with improving network performance.

Base station 260 includes one or more devices capable of transferring traffic (e.g., packets), such as audio, video, text, and/or other traffic, destined for and/or received from user devices. In some implementations, base station 260 may transmit traffic to and/or receive traffic from one or more user devices via an air interface (e.g., a radio frequency (RF) signal). In some implementations, base station 260 may receive traffic from and/or send traffic to data center 250 and/or a user device (e.g., a user device in a cell area associated with base station 260).

Client device 270 includes one or more devices capable of receiving, generating, storing, processing, and/or providing statistics and/or recommendations associated with improving network performance. For example, client device 270 may include may include a server device, a desktop computer, a laptop computer, a wireless communication device (e.g., a smart phone), a tablet computer, a wearable computer (e.g., a smart watch, a smart band, etc.), and/or the like. In some implementations, client device 270 may receive, from on-site device 220 and/or network management platform 230, one or more recommendations associated with improving network performance. In some implementations, client device 270 may display the one or more recommendations on a user interface.

Network 280 includes one or more wired and/or wireless networks. For example, network 280 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
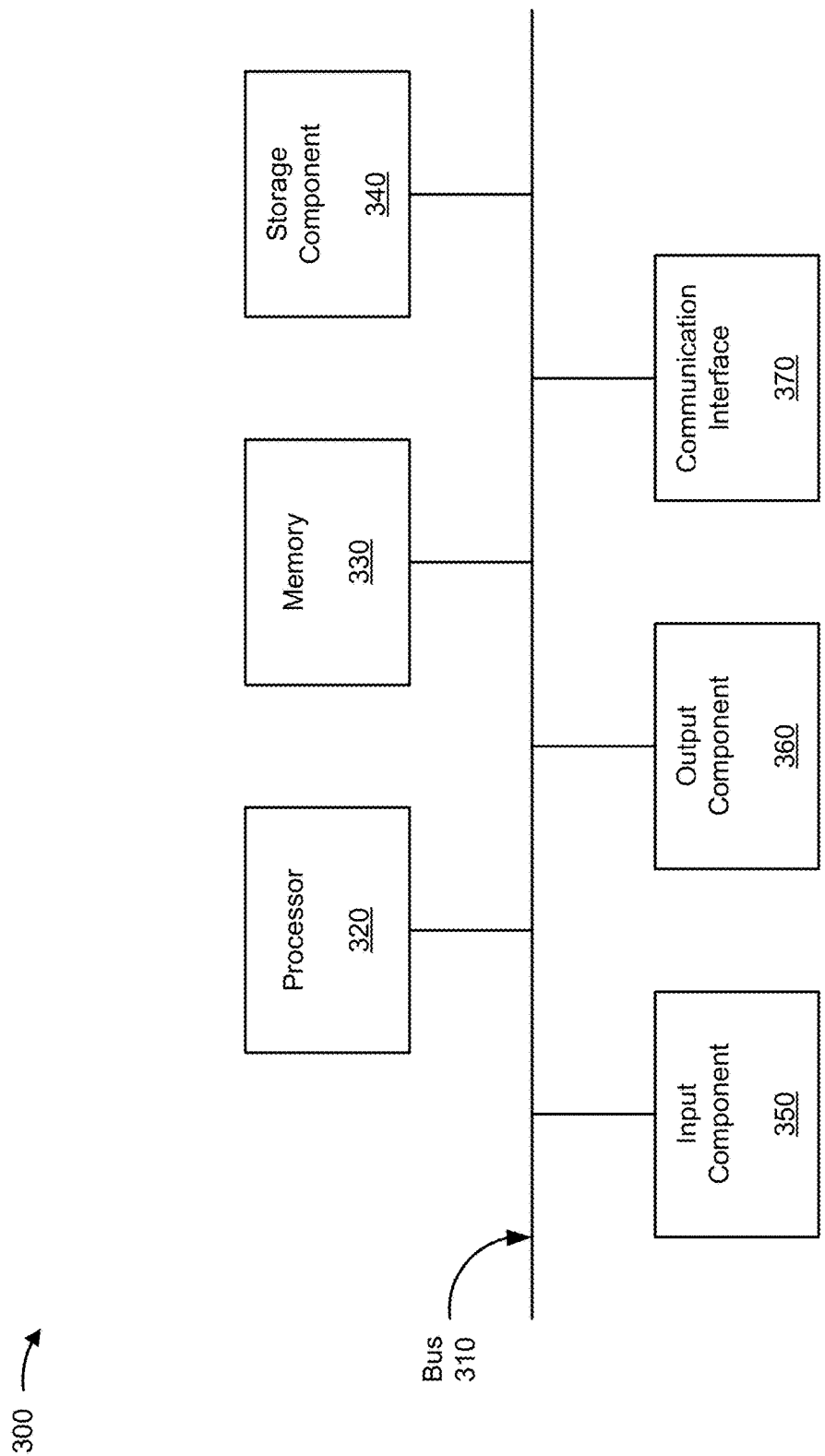
FIG. 3 is a diagram of example components of one or more devices of FIG. 2.

FIG. 3 is a diagram of example components of a device 300. Device 300 may correspond to data source 210, on-site device 220, network management platform 230, computing resource 232, a device in data center 250, base station 260, and/or client device 270. In some implementations, data source 210, on-site device 220, network management platform 230, computing resource 232, a device in data center 250, base station 260, and/or client device 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
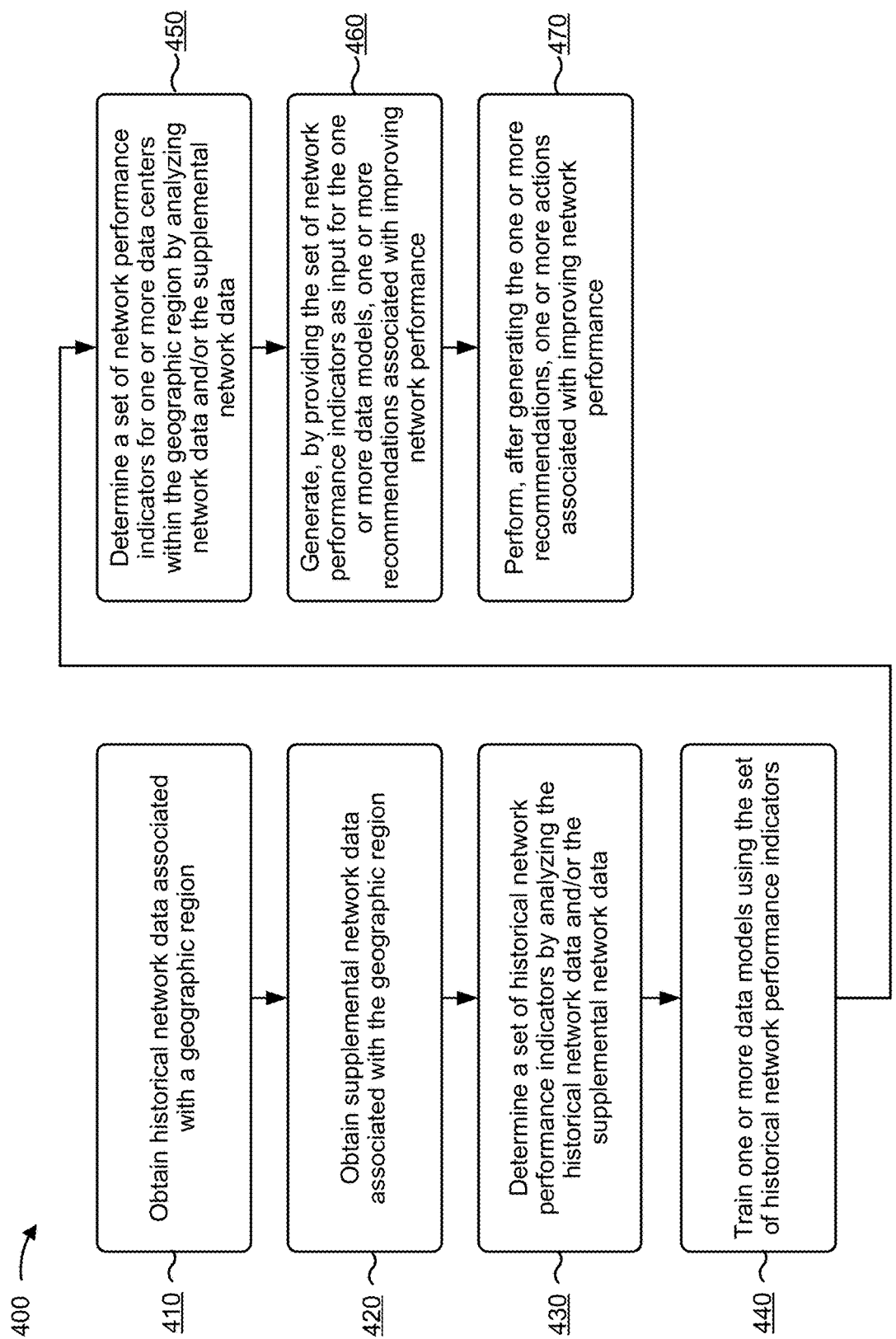
FIG. 4 is a flow chart of an example process for using machine learning to generate recommendations that may be implemented to improve network performance.

FIG. 4 is a flow chart of an example process 400 for using machine learning to generate recommendations that may be implemented to improve network performance. In some implementations, one or more process blocks of FIG. 4 may be performed by network management platform 230. In some implementations, one or more process blocks of FIG. 4 may be performed by another device or a group of devices separate from or including network management platform 230, such as data source 210, on-site device 220, a device in data center 250, base station 260, and/or client device 270.

As shown in FIG. 4, process 400 may include obtaining historical network data associated with a geographic region (block 410). For example, network management platform 230 (or on-site device 220) may obtain, from data source 210, historical network data associated with a group of user devices that have accessed a call service or a data service within a geographic region. Historical network data, as described herein, may include user device information, time information, quality of service information, network device identifier information, and/or the like.

In some implementations, data source 210 may store historical network data. For example, data source 210 may store historical network data using a data structure, such as an array, a linked-list, a tree, a graph, a hash table, database, and/or the like. In some implementations, data source 210 may store large quantities of data. For example, data source 210 may store millions, billions, or even trillions of data points.

In some implementations, network management platform 230 may obtain historical network data. For example, network management platform 230 may obtain user device information, such as a device identifier for a user device that accesses network services within the geographic region. Additionally, or alternatively, network management platform 230 may obtain quality of service information associated with a user device (e.g., a number of attempts to establish a call or a data session, a number of successful attempts to establish a call or a data session, a number of handover attempts, a number of successful handovers, etc.) and/or quality of service information associated with a data center 250 (e.g., data center capacity information, one or more quality of service parameters associated with traffic of the data center 250, etc.). Additionally, or alternatively, network management platform 230 may obtain time information, such as a time stamp indicating a time and/or a duration of a network service (e.g., a call service, a data service, etc.). Additionally, or alternatively, network management platform 230 may obtain network device identifier information for network devices within the geographic region, such as a cell identifier associated with a base station 260 used in providing a particular network service, a data center identifier associated with a data center 250 that is used in providing a particular network service, and/or the like.

In this way, network management platform 230 obtains historical network data that, as described herein, may be used to determine historical network performance indicators.

As further shown in FIG. 4, process 400 may include obtaining supplemental network data associated with the geographic region (block 420). For example, network management platform 230 (or on-site device 220) may obtain supplemental network data from one or more additional data sources that, as described herein, may be used with the historical network data to determine one or more network performance indicators.

In some implementations, network management platform 230 may obtain supplemental network data. For example, historical network data provided by data source 210 may not provide enough data to generate accurate recommendations for improving network performance. In this case, network management platform 230 may supplement the historical network data with supplemental network data. Supplemental network data may include network infrastructure information, such as location information for one or more data centers 250 and/or one or more base stations 260 in the geographic region, information indicating a type of connection (e.g., a fiber connection, a wireless connection (e.g., using microwaves), etc.) between network devices (e.g., a connection between data centers 250, a connection between base stations 260, a connection between data center 250 and base station 260, etc.), and/or the like. In some implementations, one or more types of information or data included in supplemental network data may be provided by a network service provider (e.g., stored by the first data source 210, and included in historical network data).

In some implementations, network management platform 230 may obtain supplemental network data from one or more additional data sources. For example, assume the historical network data does not include location information for the one or more data centers 250 and/or the one or more base stations 260. In this case, network management platform 230 may search (e.g., query) an additional data source (e.g., a data source that provides publicly available location information) to obtain information indicating the geographic locations of the one or more data centers 250 and/or the one or more base stations 260. Additionally, network management platform 230 may map a location of data center 250 and/or a location of base station 260 to a particular service area by associating geographic coordinates of data center 250 and/or base station 260 to a particular cell identifier included in the historical network data.

Additionally, or alternatively, network management platform 230 may obtain supplemental network data from a domain expert. For example, a domain expert may provide input to network management platform 230 indicating which network connections are made via a fiber connection (e.g., using fiber optic cable), via a copper connection, via a wireless connection (e.g., using radio frequency (RF) waves, such as a microwave), or the like. In this way, network management platform 230 may identify a type of connection between data centers 250 and/or base stations 260 within the geographic region.

In this way, network management platform 230 is able to obtain supplemental network data that may be used to determine historical network performance indicators.

As further shown in FIG. 4, process 400 may include determining a set of historical network performance indicators by analyzing the historical network data and/or the supplemental network data (block 430). For example, network management platform 230 may analyze the historical network data and/or the supplemental network data to determine a set of historical network performance indicators for the one or more data centers 250 included in the geographic region. The set of historical network performance indicators including metrics associated with measuring network performance, and may include a set of overall key performance indicators (KPIs), a set of customer demand indicators, a set of utilization rate indicators, a set of network latency indicators, and/or the like.

In some implementations, prior to determining historical network performance indicators, network management platform 230 may standardize the historical network data and/or the supplemental network data. For example, network management platform 230 may standardize the historical network data and/or the supplemental network data to allow the information to be analyzed to determine historical network performance indicators. In this case, the historical network data and/or the supplemental network data may be associated with different file types, different file formats, and/or the like, and network management platform 230 may apply a standardization technique to allow the information to be stored in a uniform format. In some implementations, network management platform 230 may apply different standardization techniques for different file types and/or file formats. By standardizing the historical network data and/or the supplemental network data, network management platform 230 may use the information to determine historical network performance indicators.

In some implementations, network management platform 230 may determine a set of historical network performance indicators for data center 250. For example, network management platform 230 may determine a historical network performance indicator of data center 250 for a set of time intervals (e.g., every hour, every minute, etc.).

In some implementations, network management platform 230 may determine an overall KPI. For example, assume the historical network data includes quality of service information associated with call services and/or data services for user devices within the geographic region. In this case, network management platform 230 may analyze the quality of service information to determine a set of KPIs, and may assign weights to each KPI to determine an overall KPI value.

As an example, assume network management platform 230 receives historical network data that includes information indicating a number of attempts to establish a call, a number of successful attempts to establish a call, a number of handover attempts, and a number of successful handover attempts. In this case, network management platform 230 may determine an established call success rate and a handover success rate, and may assign weights to each of the success rates and may use them to determine an overall KPI.

Additionally, or alternatively, network management platform 230 may determine a customer demand indicator. For example, assume the historical network data and/or the supplemental network data includes device information, time information, and/or location information for user devices that accessed network services via a particular data center 250. In this case, network management platform 230 may analyze the information to determine a number of users accessing network services at particular time intervals. In this way, network management platform 230 may use the number of users accessing network services at particular time intervals as an indicator of customer demand.

Additionally, or alternatively, network management platform 230 may determine a utilization rate indicator. For example, network management platform 230 may determine an overall KPI and a customer demand indicator for one or more base stations 260 that send traffic to and/or receive traffic from data center 250, and may use the overall KPI and customer demand indicators to determine a utilization rate indicator for each base station 260 of the one or more base stations 260. In this case, network management platform 230 may determine an average utilization rate for the one or more base stations 260, and may use the average utilization rate as the utilization rate indicator for data center 250.

Additionally, or alternatively, network management platform 230 may determine a network latency indicator. For example, network management platform 230 may determine a network latency indicator for a data center 250 by analyzing historical network data. In this case, the historical network data for the data center 250 may include data center capacity information, information identifying a distance between data center 250 and one or more base stations 260 that have sent traffic to and/or received traffic from data center 250, information indicating a queue time (e.g., an average amount of time a request waits at data center 250 before being sent out), information indicating a type of connection between the data center 250 and the one or more base stations 260, and/or the like. In some cases, network management platform 230 may determine a network latency indicator for a set of time intervals (e.g., every minute, every hour, etc.).

In this way, network management platform 230 may determine network performance indicators for one or more data centers 250 included in the geographic region, and, as described herein, may use the network performance indicators when training the data model.

As further shown in FIG. 4, process 400 may include training one or more data models using the set of historical network performance indicators (block 440). For example, network management platform 230 may use the set of historical network performance indicators and one or more machine learning techniques to train one or more data models.

In some implementations, as described herein, network management platform 230 may train a data model using a supervised machine learning technique. Additionally, or alternatively, network management platform 230 may train a data model using a different type of machine learning technique, such as machine learning via clustering, dimensionality reduction, structured prediction, anomaly detection, neutral networks, reinforcement learning, or the like.

In some implementations, network management platform 230 may train a data model. For example, network management platform 230 may train a data model by associating the one or more network performance indicators with one or more training values. A training value may indicate a degree to which a historical performance indicator is likely to influence a particular recommendation (e.g., a recommendation to commission a new data center 250, a recommendation to decommission a data center 250, a recommendation to route or reroute traffic associated with one or more data centers 250, etc.).

As an example, assume training values are part of a classification system that uses training values between 1 and 5. Further assume that a training value of 1 is an indicator of a need to commission a new data center 250, and that a training value of 5 is an indicator that there is not a need to commission a new data center 250. In this example, assume network management platform 230 analyzes quality of service information to determine an overall KPI value and a network latency value for one or more data centers 250 during a particular time interval. In this case, a low overall KPI value and a high network latency value may be indicators that the service area may benefit from commissioning a new data center 250. As such, network management platform 230 may associate a low KPI value with a training value of 1, a high KPI value with a training value of 5, a high network latency value with a training value of 1, and a low network latency value with a training value of 5.

In some implementations, network management platform 230 may train a decision tree. For example, a decision tree may include nodes and edges, and network management platform 230 may train a decision tree by using the set of historical network performance indicators as nodes and by using ranges of historical network performance indicators as edges. Additionally, the decision tree may include a set of leaf nodes associated with particular recommendations (e.g., a recommendation indicating whether to commission a new data center 250 at a particular location).

As an example, assume a parent node is associated with a high network latency value. Further assume the parent node is connected to a set of child nodes via a set of edges, where each edge is a particular range of network latency values, and the set of child nodes indicate recommendations of whether to commission a new data center 250. In this case, the high network latency value may be associated with an edge that has a high range of network latency values, which may associate the high network latency value with a child node recommending to commission a new data center 250.

Additionally, or alternatively, network management platform 230 may train a data model using a location identification technique. For example, network management platform 230 may train a decision tree using a location identification technique such as a K-means clustering algorithm. In this case, the K-means clustering algorithm may allow the decision tree to output whether to commission a new data center 250 in a particular geographic location. In this way, network management platform 230 may train a data model that may be used to recommend locations for new data centers 250.

Additionally, or alternatively, network management platform 230 may train a data model using a forecasting technique. For example, network management platform 230 may train a data model by using a forecasting technique to predict network traffic over an interval. As an example, network management platform 230 may forecast network traffic by analyzing historical network data with a linear regression algorithm. In this case, the historical network data may include time stamps associated with user devices accessing network services, and network management platform 230 may analyze the time stamps to determine an active number of user devices during particular time intervals. Additionally, network management platform 230 may apply a linear regression algorithm to forecast network traffic. In this way, network management platform 230 may forecast time intervals associated with high traffic volume, and, as described herein, perform one or more actions to improve network performance.

Additionally, or alternatively, network management platform 230 may train a data model using an anomaly detection technique. For example, network management platform 230 may train a data model using an anomaly detection technique that outputs a predicted time period at which an anomaly (e.g., a large spike in traffic) may occur. In some cases, an anomaly may be associated with a historical network performance indicator that is a threshold distance away from a median historical network performance indicator value. By training a data model to identify anomalies in network traffic, network management platform 230 may predict anomalies and may, as described herein, perform one or more actions to improve network performance.

Additionally, or alternatively, network management platform 230 may train a data model using a path-finding technique. For example, network management platform 230 may train a data model using a path-finding technique (e.g., Dijkstra's algorithm, A* search algorithm, etc.) to identify traffic re-routing paths. In this case, the data model may consider a number of different routing paths, and may output a routing path that is associated with a most effective use of network resources (e.g., the algorithm may consider connection type (e.g., fiber versus microwave), network traffic, distance, etc.). In this way, the path-finding technique may be used to output recommended routing and/or re-routing paths for the one or more data centers 250.

In some implementations, network management platform 230 may train a data model using an accelerated search technique. For example, assume network management platform 230 identifies a particular algorithm that is an effective classification algorithm but that requires a large amount of processing time. In this case, network management platform 230 may create summary indexes to create a simplified version of the particular algorithm. In this way, the particular algorithm may be used to make faster real-time decisions (e.g., relative to using the algorithm without summary indexes, and being subject to the algorithm's high processing time).

In some implementations, network management platform 230 may test a data model that has been trained. For example, network management platform 230 may provide, as input to the data model, test data (e.g., additional historical network data, additional supplemental network data, etc.) to determine whether the data model satisfies a threshold level of accuracy. In this case, values included in the test data may be associated with a particular recommendation, and network management platform 230 may test the data model using the test data to determine whether output of the data model satisfies the threshold level of accuracy.

In some implementations, a device other than network management platform 230 may train a data model. For example, another device (e.g., on-site device 220, a device accessible by a software developer, etc.) may obtain and use historical network data and/or supplemental network data to determine a set of historical network performance indicators. In this case, the other device may analyze the set of historical network performance indicators to train a data model. In this case, network management platform 230 may receive, from the other device, a data model that has been trained on a set of historical network performance indicators.

By training a data model, network management platform 230 may use the data model to generate a set of recommendations that may be used to improve network performance, as described herein.

As further shown in FIG. 4, process 400 may include determining a set of network performance indicators for one or more data centers within the geographic region by analyzing network data and/or the supplemental network data (block 450). For example, network management platform 230 may receive network data associated with a group of user devices that are actively using network services, and may analyze the network data and the supplemental network data to determine a set of network performance indicators for one or more data centers 250. The network data may include information associated with a group of user devices that are actively using network services, and may include one or more data types described herein in association with historical network data (e.g., customer device information, time information, customer quality information, etc.). The set of network performance indicators may include an overall KPI, a customer demand indicator, a utilization rate indicator, a network latency indicator, and/or the like.

In some implementations, network management platform 230 may receive network data from data center 250. Additionally, network management platform 230 may standardize the network data, in the same manner described above. In some implementations, network management platform 230 may analyze the network data to determine a set of network performance indicators in the same manner described above.

In this way, network management platform 230 is able to determine a set of network performance indicators that may be processed by the data model to generate one or more recommendations that may be used to improve network performance.

As further shown in FIG. 4, process 400 may include generating, by providing the set of network performance indicators as input for the one or more data models, one or more recommendations associated with improving network performance (block 460). For example, network management platform 230 may provide the set of network performance indicators as input for the one or more data models, which may cause the one or more data models to output recommendations that may be used to improve network performance. The recommendations may include a recommendation to commission a new data center 250, a recommendation to decommission a data center 250, a recommendation to route or reroute traffic associated with the one or more data centers 250, a recommendation to modify resources (e.g., physical resources, virtual resources, etc.) within a data center 250, a recommendation to purchase and utilize resources of a commercially available data center 250 within the geographic region, a recommendation based on a forecast of network traffic, and/or the like.

In some implementations, network management platform 230 may generate a recommendation to commission a new data center 250. For example, assume a data model has been trained using a set of historical network performance indicators and a location identification technique. In this case, network management platform 230 may provide the set of network performance indicators as input for the data model, which may cause the data model to output a recommendation to commission a new data center 250 at a particular geographic location.

Additionally, or alternatively, network management platform 230 may generate a recommendation to decommission a data center 250. For example, assume a data model has been trained using a set of historical network performance indicators and a path-finding technique. In this case, network management platform 230 may provide the set of network performance indicators as input for the data model, which may cause the data model to output a recommendation to decommission a data center 250 included within the geographic region. Additionally, the data model (or another data model) may output a recommendation indicating one or more traffic routing and/or traffic re-routing paths between network devices (e.g., to help support the load of the data center 250 that is being recommended for decommission).

Additionally, or alternatively, network management platform 230 may generate a recommendation to route or reroute traffic associated with the one or more data centers 250. For example, assume a data model has been trained using a set of historical network performance indicators and a path-finding technique. In this case, network management platform 230 may provide network performance indicators as input for the data model, which may cause the data model to output a recommendation indicating one or more traffic routing and/or rerouting paths.

Additionally, or alternatively, network management platform 230 may generate a recommendation to modify network resources. For example, assume a data model has been trained using a set of historical network performance indicators and one or more machine learning techniques (e.g., a path-finding technique, a forecasting technique, another machine learning technique, etc.). In this case, network management platform 230 may obtain a predictive network performance indicator as output from one or more data models. Additionally, network management platform 230 may compare the set of network performance indicators and the predictive network performance indicator, and may generate a recommendation to modify network resources based on the comparison. As an example, network management 230 may generate a recommendation to add resources to a data center 250, to remove resources from a data center 250, to transfer resources from a first data center 250 to a second data center 250, to reconfigure resources within a data center 250 (e.g., by reallocating virtual resources, by modifying routing algorithms, etc.), and/or the like.

In some cases, network management platform 230 may obtain a predictive network performance indicator using a decision tree. For example, network management platform 230 may use a decision tree to modify hypothetical network resources (e.g., self-generated network resources used to test network conditions), and the decision tree may output the predictive network performance indicator. In other cases, network management platform 230 may use a decision tree to modify the set of network performance indicators, and the decision tree may output the predictive network performance indicator.

Additionally, or alternatively, network management platform 230 may generate a recommendation to purchase and utilize resources of a commercially available data center 250. For example, assume a data model is trained using a set of historical network performance indicators and a location identification technique. In this case, network management platform 230 may generate a recommendation to purchase resources provided by a commercially available data center 250 that is located within a threshold distance of a location identified by the data model.

In some implementations, network management platform 230 may generate a recommendation based on a forecast of network traffic. For example, assume a data model has been trained using a set of historical network performance indicators and a forecasting technique (e.g., a linear regression algorithm). In this case, network management platform 230 may provide network performance indicators as input for the data model, which may cause the data model to output a recommendation to commission or decommission a data center 250 within a threshold time period, to recommend one or more traffic routing and/or rerouting paths, and/or the like.

In this way, network management platform 230 generates recommendations that may be used to improve network performance.

As further shown in FIG. 4, process 400 may include performing, after generating the one or more recommendations, one or more actions associated with improving network performance (block 470). For example, network management platform 230 may perform one or more actions to improve network performance or to allow another device or party to improvement network performance. The one or more actions may include providing the one or more recommendations for display on a user interface of client device 270, generating and providing statistics associated with network performance for display on the user interface of client device 270, providing instructions to automatically implement a recommendation or automatically implementing the recommendation, and/or the like.

In some implementations, network management platform 230 may provide the one or more recommendations to another device. For example, network management platform 230 may provide the one or more recommendations to another device, which may cause the other device to display the one or more recommendations on a user interface. As an example, the user interface may include a map of the geographic region, and the map may identify locations of the one or more data centers and locations of recommended new data centers.

Additionally, or alternatively, network management platform 230 may provide forecasting information for display on the user interface. For example, the user interface may display forecast information predicting time intervals of peak network traffic volume. In this way, a user may view network traffic trends prior to an increase in actual network traffic, thereby allowing the user to perform actions to mitigate against the upcoming increase in network traffic volume. Additionally, or alternatively, the user interface may display a status of each active data center and each active data centers capacity information.

Additionally, or alternatively, the user interface may display traffic routing or re-routing information. For example, network management platform 230 may use a path-finding technique to determine one or more traffic routing or rerouting paths for the one or more data centers, and the one or more paths may be displayed on the user interface. In this way, network management platform 230 may recommend improvements to efficiency without modifying existing data center infrastructure.

Additionally, or alternatively, network management platform 230 may provide cost information for display on the user interface. For example, network management platform 230 may generate summaries that indicate an amount of energy cost may be needed to implement the one or more data centers, and to indicate an amount of savings generated by using the data model.

Additionally, or alternatively, assume network management platform 230 generates a recommendation to commission a new data center. In this case, network management platform 230 may automatically search one or more additional data sources (e.g., publicly available real estate websites) to identify real estate or land that is available within a threshold distance of the recommended location. Additionally, network management platform 230 may use search criteria such as an amount of resources needed for the data center 250, and may provide purchase information for the real estate for display on a user interface of a client device.

Additionally, or alternatively, assume network management platform 230 generates a recommendation to route or reroute traffic at one or more data centers 250. In this case, network management platform 230 may use an application programming interface (API) to automatically modify one or more network routing paths to allow traffic to be rerouted based on the recommendation.

Additionally, or alternatively, assume network management platform 230 generates a recommendation to modify resources within one or more data centers 250. In this case, network management platform 230 may provide an instruction to modify physical resources (e.g., by installing or removing equipment at a data center 250) and/or may use an application programming interface (API) to automatically modify (e.g., increase, decrease, etc.) virtual resources within one or more data centers. Additionally, or alternatively, network management platform 230 may use an API to automatically reconfigure resources within a data center (e.g., by reallocating virtual resources, by modifying a routing algorithm, etc.).

In this way, network management platform 230 performs one or more actions that, if implemented, improve network performance.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

By using machine learning to generate recommendations that may be implemented to improve network performance, network management platform 230 conserves network resources by determining efficient routing and rerouting paths, reduces cost (e.g., by saving energy resources), improves customer service (e.g., by reducing customer churn), and/or the like. Additionally, by efficiently processing real-time network data (e.g., real-time relative to receiving network data from one or more data centers), network management platform 230 is able to provide recommendations that may be implemented to improve current network performance.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    a memory; and
        one or more processors to:
        obtain historical network data that includes information associated with a group of user devices that accessed network services within a geographic region;
        determine a set of historical network performance indicators for one or more data centers within the geographic region by analyzing the historical network data;
        train one or more data models using the set of historical network performance indicators;
        receive, after training the one or more data models, network data for a group of user devices actively using network services in the geographic region,
        the historical network data and/or the network data including at least one of:
        user device information associated with the group of user devices,
        time information associated with the group of user devices, or
        quality of service information associated with the group of user devices;
        determine a set of network performance indicators for the one or more data centers by analyzing the network data;
        generate, by providing the set of network performance indicators as input to the one or more data models, one or more recommendations associated with improving network performance,
        the one or more recommendations including a recommendation to purchase resources provided by a commercially available data center that is located within a threshold distance of a location identified by a data model of the one or more data models; and
        perform, based on the one or more recommendations, one or more actions associated with improving network performance.

2. The device of claim 1, where the one or more processors are further to:
    obtain, after obtaining the historical network data, supplemental network data that includes network infrastructure information for a network infrastructure within the geographic region;
    where the one or more processors, when determining the set of historical network performance indicators, are to:
    determine the set of historical network performance indicators by analyzing the supplemental network data; and
    where the one or more processors, when determining the set of network performance indicators, are to:
    determine the set of network performance indicators by analyzing the supplemental network data.

3. The device of claim 1, where the set of historical network performance indicators and the set of network performance indicators include at least one of:
    a set of overall key performance indicators (KPIs),
    a set of customer demand indicators,
    a set of utilization rate indicators, or
    a set of network latency indicators.

4. The device of claim 1, where training the one or more data models comprises:
    training a data model of the one or more data models with the set of historical network performance indicators and at least one of:
    a location identification technique,
    a path-finding technique,
    a forecasting technique, or
    an accelerated search technique.

5. The device of claim 1, where the historical network data is a first set of historical network data; and where the one or more processors, after training the one or more data models, are further to:
obtain a second set of historical network data associated with another group of user devices that accessed network services within the geographic region;
provide the second set of historical network data as input for the data model;
determine whether output of the data model satisfies a threshold level of accuracy; and
retrain the data model until an output of the data model satisfies the threshold level of accuracy.

6. The device of claim 1, where the one or more processors, when training the one or more data models, are to:
train a decision tree using the set of historical network performance indicators and a location identification technique; and
where the one or more recommendations further include a different recommendation to commission a new data center,
the different recommendation identifying a location for the new data center.

7. The device of claim 1, where the one or more recommendations further include a different recommendation to reroute traffic at one or more of the one or more data centers; and
where the one or more processors, when performing the one or more actions, are to:
modify, using an application programming interface (API), one or more network routing paths to allow traffic to be rerouted based on the recommendation.

8. A method, comprising:
receiving, by a device, one or more data models that have been trained on a set of historical network performance indicators,
the set of historical network performance indicators including metrics associated with measuring network performance for one or more data centers;
receiving, by the device, network data for a group of user devices that are actively using the one or more data centers for network services,
the historical network data and/or the network data including at least one of:
user device information associated with the group of user devices,
time information associated with the group of user devices, or
quality of service information associated with the group of user devices;
determining, by the device, a set of network performance indicators for the one or more data centers;
generating, by the device and by providing the set of network performance indicators as input to the one or more data models, one or more recommendations associated with improving network performance,
the one or more recommendations including a recommendation to purchase resources provided by a commercially available data center that is located within a threshold distance of a location identified by a data model of the one or more data models; and
performing, by the device and after generating the one or more recommendations, one or more actions associated with improving network performance.

9. The method of claim 8, where generating the one or more recommendations comprises:
providing the set of network performance indicators as input for a data model of the one or more data models,
the data model to process the set of network performance indicators using an accelerated search technique,
the data model to output one or more values associated with the one or more recommendations; and
generating the one or more recommendations based on the output of the data model.

10. The method of claim 8, where generating the one or more recommendations comprises:
obtaining a predictive network performance indicator as output from the one or more data models,
comparing the set of network performance indicators and the predictive network performance indicator, and
generating a different recommendation, of the one or more recommendations, to modify network resources based on comparing the set of network performance indicators and the predictive network performance indicator.

11. The method of claim 10, where obtaining the predictive network performance indicator comprises:
obtaining the predictive network performance indicator by using a decision tree to modify hypothetical network resources.

12. The method of claim 8,
where receiving the one or more data models comprises:
receiving a data model of the one or more data models that has been trained using the set of historical network performance indicators and a forecasting technique; and
where the one or more recommendations further include a different recommendation that includes forecast information predicting an amount of network traffic volume for a time period.

13. The method of claim 8, where receiving the one or more data models comprises:
receiving a data model of the one or more data models that has been trained using the set of historical network performance indicators and an anomaly detection technique; and
where generating the one or more recommendations comprises:
generating a recommendation that includes information identifying a time at which an anomaly is likely to occur,
the anomaly being associated with a spike in network traffic.

14. The method of claim 8, where performing the one or more actions comprises:
providing the one or more recommendations to another device,
the other device to display the one or more recommendations on a user interface.

15. A non-transitory computer-readable medium storing instructions, the instructions comprising:
one or more instructions that, when executed by one or more processors, cause the one or more processors to:
receive one or more data models that have been trained on a set of historical network performance indicators,
the set of historical network performance indicators including metrics associated with measuring network performance for one or more data centers;
receive network data for a group of user devices that are actively using the one or more data centers for network services,
the historical network data and/or the network data including at least one of:

user device information associated with the group of user devices, time information associated with the group of user devices, or quality of service information associated with the group of user devices;

determine, by analyzing the network data, a set of network performance indicators for the one or more data centers;

generate, by providing the set of network performance indicators as input to the one or more data models, one or more recommendations associated with improving network performance, the one or more recommendations including a recommendation to purchase resources provided by a commercially available data center that is located within a threshold distance of a location identified by a data model of the one or more data models; and perform, after generating the one or more recommendations, one or more actions associated with improving network performance.

16. The non-transitory computer-readable medium of claim 15, where the one or more instructions, that cause the one or more processors to receive the one or more data models, cause the one or more processors to:

receive a data model of the one or more data models that has been trained with the set of historical network performance indicators and at least one of:

a location identification technique, a path-finding technique, or a forecasting technique, where the location identification technique, the path-finding technique, or the forecasting technique is used with an accelerated search technique.

17. The non-transitory computer-readable medium of claim 15, where the one or more instructions, that cause the one or more processors to receive the one or more data models, cause the one or more processors to:

receive a decision tree that uses historical network performance indicators as nodes and ranges of historical network performance indicators as edges; and where the one or more instructions, that cause the one or more processors to generate the one or more recommendations, cause the one or more processors to:

provide the set of network performance indicators as input for the decision tree to cause the decision tree to output a recommendation to commission a new data center or to decommission a data center of the one or more data centers.

18. The non-transitory computer-readable medium of claim 15, where the one or more instructions, that cause the one or more processors to perform the one or more actions, cause the one or more processors to:

provide the one or more recommendations for display on a user interface of a device, and provide one or more statistics associated with improving network performance for display on the user interface of the device.

19. The non-transitory computer-readable medium of claim 15, where the one or more instructions, that cause the one or more processors to perform the one or more actions, cause the one or more processors to:

provide an instruction to automatically implement a recommendation of the one or more recommendations.

* * * * *